(12) United States Patent
Xiao et al.

(10) Patent No.: US 12,683,195 B2
(45) Date of Patent: *Jul. 14, 2026

(54) BATTERY

(71) Applicant: Ningde Amperex Technology Limited, Ningde (CN)

(72) Inventors: Liangzhen Xiao, Ningde (CN); Qiao Zeng, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 639 days.

This patent is subject to a terminal disclaimer.

(21) Appl. No.: 18/192,888

(22) Filed: Mar. 30, 2023

(65) Prior Publication Data

US 2023/0238655 A1 Jul. 27, 2023

Related U.S. Application Data

(63) Continuation of application No. PCT/CN2021/076082, filed on Feb. 8, 2021.

(51) Int. Cl.
H01M 10/0587 (2010.01)
H01M 4/13 (2010.01)
(Continued)

(52) U.S. Cl.
CPC ......... H01M 10/0587 (2013.01); H01M 4/13 (2013.01); H01M 4/62 (2013.01);
(Continued)

(58) Field of Classification Search
CPC ......... H01M 10/0587; H01M 10/0525; H01M 10/4235; H01M 4/13; H01M 4/62; H01M 4/595
See application file for complete search history.

(56) References Cited

U.S. PATENT DOCUMENTS

2010/0035140 A1* 2/2010 Miyahisa ............ H01M 10/052
429/129
2010/0221607 A1 9/2010 Hatanaka et al.
(Continued)

FOREIGN PATENT DOCUMENTS

CN 101640280 A 2/2010
CN 105474454 A 4/2016
(Continued)

OTHER PUBLICATIONS

Office Action issued on Feb. 3, 2024, in corresponding Chinese Application No. 202110184408.9, 10 pages.
(Continued)

*Primary Examiner* — Eugenia Wang
(74) *Attorney, Agent, or Firm* — Maier & Maier, PLLC

(57) ABSTRACT

A battery includes a negative electrode active material layer, a positive electrode active material layer. The negative electrode active material layer includes a first portion and a second portion including a first surface and a first end. The first surface is connected to the first portion by using a first connection part. A thickness of the second portion decreases from the first connection part to the first end. The positive electrode active material layer includes a third portion and a fourth portion including a second surface and a second end. The first surface is at least partially opposite to the second surface, and the second surface is connected to the third portion by using a second connection part. A thickness of the fourth portion gradually decreases from the second connection part to the second end. The first connection part is located between the second connection part and the second end.

22 Claims, 11 Drawing Sheets

(51) Int. Cl.

| | | |
|---|---|---|
| *H01M 4/62* | (2006.01) | |
| *H01M 10/0525* | (2010.01) | |
| *H01M 10/42* | (2006.01) | |
| *H01M 50/595* | (2021.01) | |

(52) U.S. Cl.
   CPC ... *H01M 10/0525* (2013.01); *H01M 10/4235* (2013.01); *H01M 50/595* (2021.01)

(56)            References Cited

U.S. PATENT DOCUMENTS

| | | |
|---|---|---|
| 2016/0181650 A1 | 6/2016 | Ide |
| 2018/0366786 A1* | 12/2018 | Fujii ...................... H01M 4/13 |
| 2020/0067081 A1 | 2/2020 | Hirai et al. |

FOREIGN PATENT DOCUMENTS

| | | |
|---|---|---|
| CN | 107732146 A | 2/2018 |
| CN | 208226027 U | 12/2018 |
| CN | 208298951 U | 12/2018 |
| CN | 106058296 B | 2/2019 |
| CN | 209045679 U | 6/2019 |
| CN | 111916667 A | 11/2020 |
| CN | 111916845 A | 11/2020 |
| CN | 111969214 A | 11/2020 |
| CN | 111987285 A | 11/2020 |
| CN | 112310396 A | 2/2021 |
| CN | 112310483 A | 2/2021 |
| CN | 214203736 U | 9/2021 |
| EP | 3416215 A1 | 12/2018 |
| WO | 2015065098 A2 | 5/2015 |

OTHER PUBLICATIONS

Office Action issued on Jul. 3, 2024, in corresponding Chinese Application No. 202110184408.9, 12 pages.

Extended Search Report issued on Jun. 21, 2024, in corresponding European Application No. 21923860.7, 10 pages.

International Search Report issued on Oct. 26, 2021 in corresponding application No. PCT/CN2021/076082; 6 pgs.

* cited by examiner

1

BATTERY

CROSS-REFERENCE TO RELATED APPLICATION

The present application is a continuation application of PCT Application Serial No. PCT/CN2021/076082, filed on Feb. 8, 2021, the content of which is incorporated herein by reference in its entirety.

TECHNICAL FIELD

This application relates to a battery.

BACKGROUND

Lithium-ion batteries have many advantages such as high energy density, long cycle life, high nominal voltage, low self-discharge rate, small size, and light weight, and therefore are widely used in the field of consumer electronics. In a lithium battery, to inhibit lithium precipitation, a size of an active material layer of a negative electrode plate is generally larger than a size of an active material layer of a positive electrode plate. Furthermore, from the viewpoint of increasing energy density of the lithium battery, a smaller difference between the sizes of the active material layer of the negative electrode plate and the active material layer of the positive electrode plate is desirable. However, when the difference between the sizes of the active material layer of the negative electrode plate and the active material layer of the positive electrode plate is kept as small as possible while maintaining an edge of the active material layer of the negative electrode plate beyond an edge of the active material layer of the positive electrode plate, in a manufacturing process, especially in a process of wound batteries, higher accuracy is required in the manufacturing process. Otherwise, lithium precipitation on the edge of the negative electrode plate of the battery is caused, reducing safety performance of the battery.

SUMMARY

In view of the above, it is necessary to provide a battery that helps to inhibit lithium precipitation while maintaining high energy density.

This application provides a battery, including a negative electrode active material layer, a positive electrode active material layer, and a separator disposed between the positive electrode active material layer and the negative electrode active material layer. In a first direction, the negative electrode active material layer includes a first portion and a second portion connected to the first portion. The second portion includes a first surface and a first end. The first surface is connected to the first portion by using a first connection part, and the first end is away from the first connection part and is a terminal part the negative electrode active material layer. A thickness of the second portion in a second direction perpendicular to the first direction gradually decreases from the first connection part to the first end in the first direction. In the first direction, the positive electrode active material layer includes a third portion and a fourth portion connected to the third portion, and the fourth portion includes a second surface and a second end. The second surface is connected to the third portion by using a second connection part, and the second end is away from the second connection part and is a terminal part of the positive electrode active material layer. A thickness of the fourth portion in the second direction gradually decreases from the second connection part to the second end in the first direction. The first surface and the second surface are at least partially arranged opposite to each other, and in the first direction, the first connection part is located between the second connection part and the second end.

In an embodiment of this application, in the first direction, the second end is located between the first connection part and the first end.

In an embodiment of this application, the first portion includes a third surface, and the third portion includes a fourth surface. The third surface and the first surface are connected by using the first connection part, the fourth surface and the second surface are connected by using the second connection part, and the third surface and the fourth surface are at least partially arranged opposite to each other.

In an embodiment of this application, the third surface and the fourth surface at least partially overlap in the second direction, the first surface and the second surface at least partially overlap in the second direction, and the third surface and the second surface at least partially overlap in the second direction.

In an embodiment of this application, a distance from the third surface to the fourth surface in the second direction is a first distance, and a distance from the first surface to the second surface in the second direction is a second distance, where the first distance is different from the second distance.

In an embodiment of this application, the first distance is less than the second distance.

In an embodiment of this application, a distance from the third surface to the second surface in the second direction is a third distance, where the third distance is different from the first distance.

In an embodiment of this application, the third distance is greater than the first distance.

In an embodiment of this application, the third distance is different from the second distance.

In an embodiment of this application, the third distance is less than the second distance.

In an embodiment of this application, viewed from the second direction, the first end has a first zone with a first spacing from the first zone to the second end in the first direction and a second zone with a second spacing from the second zone to the second end in the first direction, where the first spacing is different from the second spacing.

In an embodiment of this application, viewed from the second direction, the second end has a plurality of protrusions.

In an embodiment of this application, the battery further includes a first layer, and the first layer binds the second end and the second surface and contiguously covers the second end and the second surface. The first layer is configured to block migration of ions.

In an embodiment of this application, the first layer further binds the fourth surface and covers at least a part of the fourth surface.

In an embodiment of this application, the battery further includes a positive electrode current collector, the positive electrode current collector is located on one side of the positive electrode active material layer facing away from the first surface and the third surface, the positive electrode current collector includes a first zone on which the positive electrode active material layer is provided on the first zone and a second zone that is located on one side of the second end away from the second connection part in the first direction, the second zone is provided with no positive electrode active material layer, and the first layer binds the second zone and covers at least a part of the second zone.

In an embodiment of this application, in the first direction, the first layer includes a third end and a fourth end that are arranged away from each other, and in the first direction, the third end is located on one side of the second connection part away from the second end, and the fourth end is located on one side of the second connection part away from the third end; and viewed from the second direction, a distance from the second end to the third end is a fourth distance, a distance from the second end to the fourth end is a fifth distance, and the fourth distance is different from the fifth distance.

In an embodiment of this application, the fourth distance is less than the fifth distance.

In an embodiment of this application, the fourth surface includes a third zone, a step zone, and a fourth zone that are sequentially connected in the first direction, and a thickness of a part of the positive electrode active material layer corresponding to the fourth zone in the second direction is less than a thickness of a part of the positive electrode active material layer corresponding to the third zone; and viewed from the second direction, the fourth zone is located between the step zone and the first connection part, and the first layer covers the fourth zone.

In an embodiment of this application, a thickness of the first layer in the second direction is greater than a height of the step zone in the second direction.

In an embodiment of this application, a part of the first layer located in the fourth zone includes a fifth surface, the fifth surface is opposite from the fourth zone, and the fifth surface includes a part having a distance to the third zone in the second direction greater than a distance to the third surface in the second direction.

According to the battery in this application, in the first direction, the first connection part of the negative electrode active material layer is located between the second connection part of the positive electrode active material layer and the second end of the positive electrode active material layer, thereby helping to inhibit lithium precipitation while maintaining energy density of the battery.

REFERENCE SIGNS OF MAIN COMPONENTS

Figure 1:
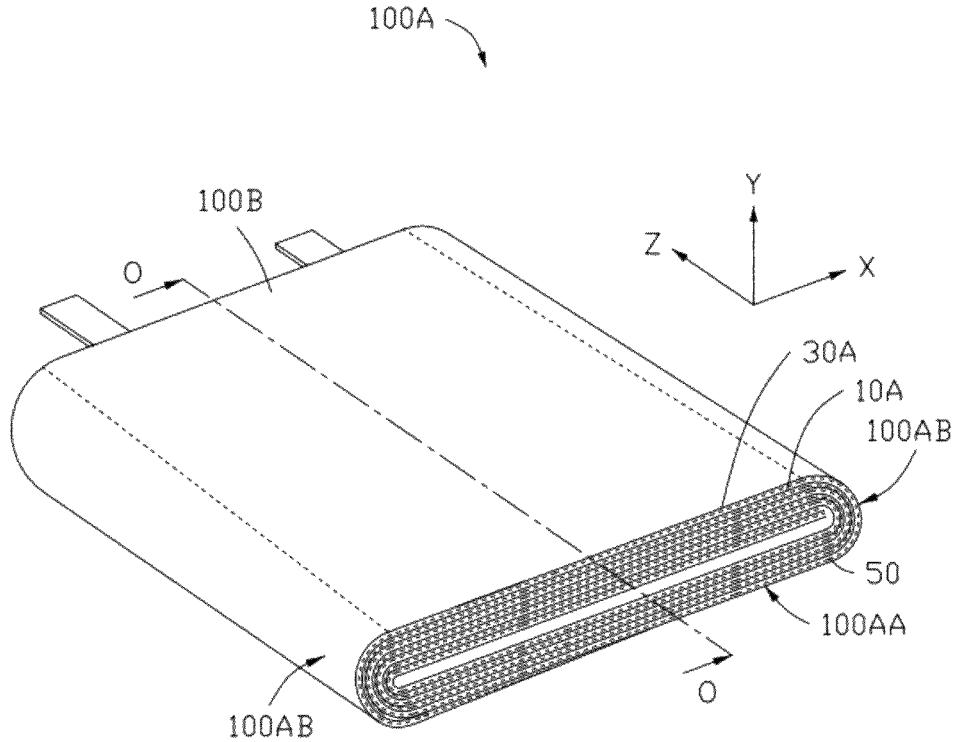
FIG. 1 is a schematic structural diagram of a battery according to an embodiment of this application.

| | |
|---|---|
| Battery | 100 |
| Electrode assembly | 100A |
| Main plane | 100B |
| Negative electrode plate | 10A |
| Positive electrode plate | 30A |
| Separator | 50 |
| Negative electrode active material layer | 10 |
| Negative electrode current collector | 10a |
| First zone | 10a1, 30a1 |
| Second zone | 10a2, 30a2 |
| First direction | X |
| First portion | 11 |
| Second portion | 13 |
| First surface | 130 |
| First end | 131 |
| Third surface | 110 |
| First connection part | 101 |
| Second direction | Y |
| Third direction | Z |
| Positive electrode active material layer | 30 |
| Positive electrode current collector | 30a |
| Third portion | 31 |
| Fourth portion | 33 |
| Second surface | 330 |
| Second end | 331 |
| Fourth surface | 310 |
| Second connection part | 301 |
| Central axis | O-O |
| Flat portion | 100AA |
| Bending end portion | 100AB |
| Protrusion | 333, 133 |
| First layer | 60 |
| Third end | 62 |
| Fourth end | 64 |
| Third zone | 310a |
| Step zone | 310b |
| Fourth zone | 310c |
| Fifth surface | 66 |
| First face | 10aa, 30aa |
| Second face | 10ab, 30ab |
| Crease | 65 |

This application will be further described with reference to the accompanying drawings in the following embodiments.

DETAILED DESCRIPTION

The technical solutions in the embodiments of this application are clearly described below in detail. Apparently, the described embodiments are only a part rather than all of the embodiments of this application. Unless otherwise defined, all technical and scientific terms used herein shall have the same meanings as commonly understood by those skilled in the art to which this application belongs. The terms used in the specification of this application are merely intended to describe specific embodiments but not intended to constitute any limitation on this application.

The embodiments of this application are described below in detail. However, this application may be embodied in many different forms, and should not be construed as being limited to the example embodiments explained herein. Rather, these example embodiments are provided so that this application can be conveyed to those skilled in the art in a thorough and detailed manner.

In addition, for brevity and clarity, in the accompanying drawings, various components and layers may be magnified in size or thickness. Throughout the text, the same numerical values represent the same elements. As used herein, the term "and/or" includes any and all combinations of one or more related listed items. In addition, it should be understood that when an element A is referred to as "connecting" an element B, the element A may be directly connected to the element B, or there may be an intermediate element C and the element A and the element B may be indirectly connected to each other.

Further, the use of "may" when describing the embodiments of this application refers to "one or more embodiments of this application".

The terminology used herein is for the purpose of describing specific embodiments and is not intended to limit this application. As used herein, singular forms are intended to also include plural forms, unless otherwise clearly specified. It should be further understood that the term "including", when used in this specification, refers to the presence of the described features, values, steps, operations, elements, and/or components, but does not exclude the presence or addition of one or more other features, values, steps, operations, elements, components, and/or combinations thereof.

Spatial related terms such as "above" may be used herein for ease of description to describe the relationship between one element or feature and another element (a plurality of elements) or feature (a plurality of features) as illustrated in the figure. It should be understood that, in addition to the directions described in the figures, the spatial related terms are intended to include different directions in the use or operation of devices or apparatus. For example, if a device in the figure is turned over, an element described as "on" or "above" another element or feature should be oriented "below" or "under" the another element or feature. Therefore, the example term "above" may include directions of above and below.

It should be understood that when an element or layer is described as being "on" another element or layer, "connected to" another element or layer, "coupled to" another element or layer, or "close to" another element or layer, the element or layer may be "directly on" the another element or layer, "directly coupled to" the another element or layer, or "directly connected to" the another element or layer, "directly combined with" the another element or layer, or "directly close to" the another element or layer, or there may be one or more intermediate elements or intermediate layers. In addition, "connection", "connected", or the like may also mean "electrically connected" or the like based on its content understood by those skilled in the art. In addition, when an element, component, zone, layer, and/or portion is described as being "between" two elements, components, zones, layers, and/or portions, it may be the only element, component, zone, layer, and/or portion between the two elements, components, zones, layers, and/or portions, or one or more intermediate elements, components, zones, layers, and/or portions may be present.

It should be understood that although the terms first, second, third, or the like may be used herein to describe various elements, components, zones, layers, and/or portions, these elements, components, zones, layers, and/or portions should not be limited by these terms. These terms are used to distinguish one element, component, zone, layer, or portion from another element, component, zone, layer, or portion. Therefore, the first element, component, zone, layer, or portion discussed below may be referred to as the second element, component, zone, layer, or portion without departing from the teachings of the example embodiments.

In this application, a first direction X and a third direction Z are perpendicular to each other and parallel to a main plane of an electrode assembly, and a second direction Y is perpendicular to the main plane of the electrode assembly, that is, a thickness direction of the electrode assembly. The main plane of the electrode assembly is a surface (100B in FIG. 1) of a flat portion of the electrode assembly. The thickness direction of the electrode assembly is a stacking direction of electrode plates in the flat portion of the electrode assembly.

Some embodiments of this application are described in detail below. In absence of conflicts, the following embodiments and features in the embodiments may be combined.

Figure 2:
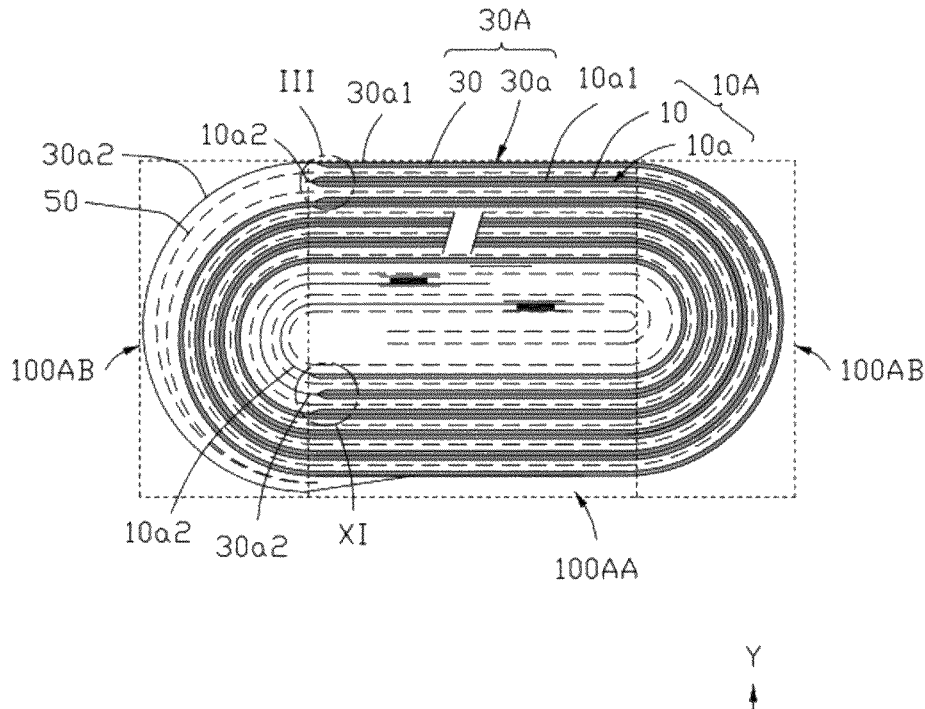
FIG. 2 is a schematic cross-sectional diagram of a battery according to an embodiment of this application.

Referring to FIGS. 1 and 2, a battery 100 includes an electrode assembly 100A. FIG. 2 is a cross-section of a plane formed by the battery 100 in FIG. 1 in directions X and Y. The electrode assembly 100A includes a negative electrode plate 10A, a positive electrode plate 30A, and a separator 50 located between the positive electrode plate 30A and the negative electrode plate 10A. The separator 50 includes an electrical insulating material, and ions may pass through the separator 50.

A positional relationship between the negative electrode plate 10A and the positive electrode plate 30A is further described below.

As shown in FIG. 1, the negative electrode plate 10A, the separator 50, and the positive electrode plate 30A are stacked to form a stack, and then the stack is wound around a central axis O-O of the third direction Z for multiple times to form the electrode assembly 100A.

The electrode assembly 100A includes a flat portion 100AA, and a plurality of bending end portions 100AB in the X direction, and the plurality of bending end portions 100AB are distributed on opposite sides of a center of the flat portion 100AA of the battery 100 in the X direction, and on the left and right sides in FIG. 2.

The negative electrode plate 10A is further described below.

Referring to FIG. 2, the negative electrode plate 10A includes a negative electrode active material layer 10 and a negative electrode current collector 10a. The negative electrode active material layer 10 is provided on a surface of the negative electrode current collector 10a.

The negative electrode current collector 10a is conductive and includes a conductive material. The conductive material, for example, may include at least one or more of conductive metals such as nickel and copper, and alloys thereof. In some embodiments, the negative electrode current collector 10a, for example, may include but is not limited to at least one or two of conductive metal sheets such as nickel foil and copper foil. The negative electrode current collector 10a includes a first face 10aa and a second face 10ab that are disposed back to back with each other. The first face 10aa of the negative electrode current collector 10a includes a first zone 10a1 and a second zone 10a2, and the second face 10ab of the negative electrode current collector 10a includes a first zone 10a1 and a second zone 10a2. The first zones 10a1 are zones where active materials are provided to form an active material layer, and the second zones 10a2 are zones where no active material layer is formed. In some embodiments, the first face 10aa may include two second zones 10a2 that are connected to two ends of the first zone 10a1 of the first face 10aa, and the second face 10ab may include two second zones 10a2 that are connected to two ends of the first zone 10a1 of the second face 10ab. An area of the first zone 10a1 of the first face 10aa may be greater than an area of the first zone 10a1 of the second face 10ab.

The negative electrode active material layer 10 is provided on the first zone 10a1 of the first face 10aa and the first zone 10a1 of the second face 10ab of the negative electrode current collector 10a. The negative electrode active material layer 10, for example, may include at least but is not limited to one or more of graphite, soft carbon, hard carbon, graphene, meso-carbon microbeads, silicon-based materials, tin-based materials, lithium titanate, or other metals capable of forming alloys with lithium.

In some embodiments, a thickness of the negative electrode current collector 10a may be 2 micrometers to 13 micrometers, and a thickness of the negative electrode active material layer 10 may be 80 micrometers to 300 micrometers.

In some embodiments, a ratio of a thickness of the negative electrode active material layer 10 to a thickness of the negative electrode current collector 10a may be 5 to 30, helping to reduce a proportion of the thickness of the negative electrode current collector 10a to an overall thickness of the battery, thereby helping to increase energy density of the battery.

Figure 3:
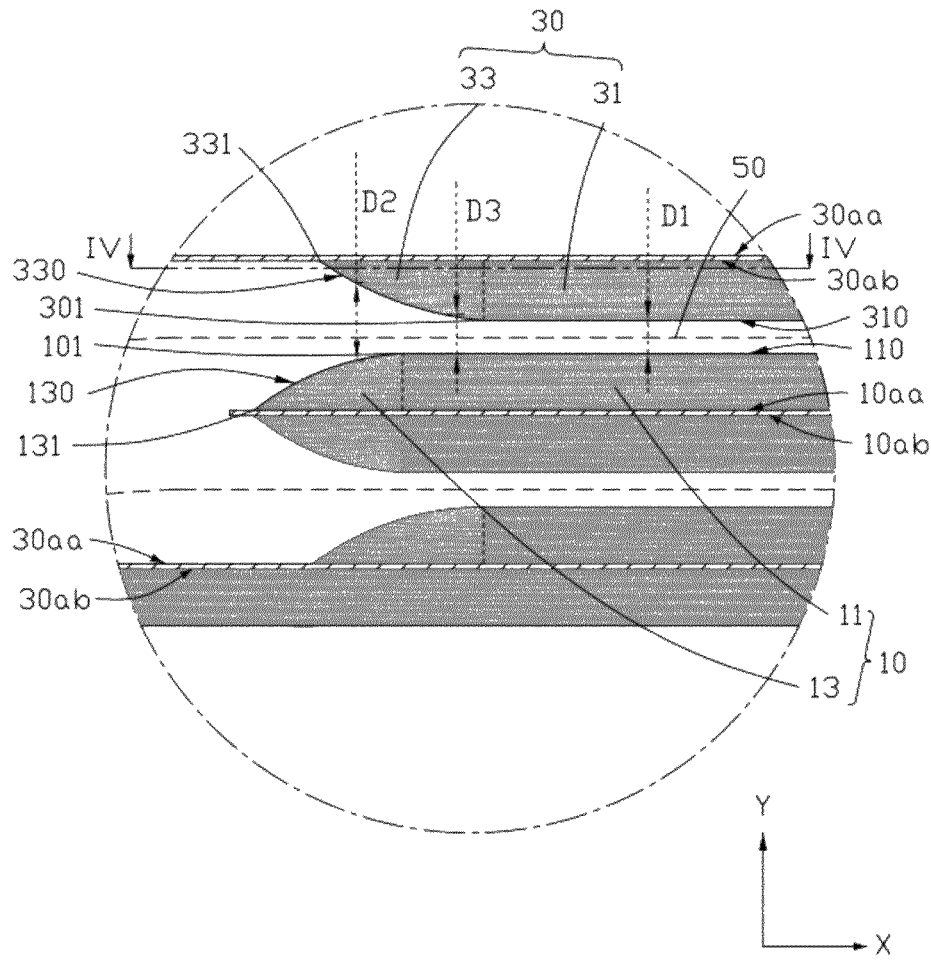
FIG. 3 is a partially enlarged schematic diagram of part III of the battery in FIG. 2 according to an embodiment of this application.

Referring to FIG. 3, the negative electrode active material layer 10 includes a first portion 11 and a second portion 13 connected to the first portion 11 in the first direction X. The second portion 13 includes a first surface 130 and a first end 131, and the first portion 11 includes a third surface 110. The third surface 110 is connected to the first surface 130 by using a first connection part 101. The first end 131 is a terminal part of the second portion 13 away from the first connection part 101, and the first end 131 is a terminal part of the negative electrode active material layer 10.

A thickness of the second portion 13 in the second direction Y perpendicular to the first direction X progressively decreases from the first connection part 101 to the first end 131 in the first direction X. That is, the first connection part 101 is a portion where the thickness of the second portion 13 in the second direction Y starts to decrease in the first direction X. In some embodiments, the thickness of the second portion 13 in the second direction Y decreases monotonically from the first connection part 101 to the first end 131 in the first direction X, where the thickness may decrease linearly or decrease curvilinearly.

Viewed from the second direction Y, the first end 131 is located in the flat portion 100AA. The negative electrode active material layer 10 is disposed in the first zone 10a1, and the second zone 10a2 is provided on one side of the first end 131 away from the first connection part 101 in the first direction X.

The positive electrode plate 30A is further described below.

Referring to FIG. 2, the positive electrode plate 30A includes a positive electrode active material layer 30 and a positive electrode current collector 30a. The positive electrode active material layer 30 is provided on a surface of the positive electrode current collector 30a.

The positive electrode current collector 30a is conductive and includes a conductive material. The conductive material, for example, may include at least one or more of conductive metals such as aluminum, copper, and nickel and alloys thereof. In some embodiments, the positive electrode current collector 30a, for example, may include but is not limited to at least one or more of conductive metal sheets such as aluminum meshes, aluminum foil, copper meshes, copper foil, and nickel foil. The positive electrode current collector 30a includes a first face 30aa and a second face 30ab that are disposed back to back with each other. The first face 30aa of the positive electrode current collector 30a includes a first zone 30a1 and a second zone 30a2, and the second face 30ab of the positive electrode current collector 30a includes a first zone 30a1 and a second zone 30a2. The first zones 30a1 are zones where active materials are provided to form an active material layer, and the second zones 30a2 are zones where no active material layer is formed. In some embodiments, the first face 30aa may include two second zones 30a2 that are connected to two ends of the first zone 30a1 of the first face 30aa, and the second face 30ab may include two second zones 30a2 that are connected to two ends of the first zone 30a1 of the second face 30ab. An area of the first zone 30a1 of the first face 30aa may be less than an area of the first zone 30a1 of the second face 30ab.

The positive electrode active material layer 30 is provided on the first zone 30a1 of the first face 30aa and the first zone 30a1 of the second face 30ab of the positive electrode current collector 30a. The positive electrode active material layer 30, for example, may include at least but is not limited to one or more of lithium cobaltate, lithium nickel cobalt manganate, lithium nickel cobalt aluminate, lithium manganate, lithium nickelate, lithium manganese iron phosphate, lithium vanadium phosphate, lithium vanadyl phosphate, lithium iron phosphate, and lithium-rich manganese-based materials.

In some embodiments, a thickness of the positive electrode current collector 30a may be 3 micrometers to 15 micrometers, and a thickness of the positive electrode active material layer 30 may be 80 micrometers to 300 micrometers.

In some embodiments, a ratio of a thickness of the positive electrode active material layer 30 to a thickness of the positive electrode current collector 30a may be 5 to 30, helping to reduce a proportion of the thickness of the positive electrode current collector 30a to an overall thickness of the battery, thereby helping to increase energy density of the battery.

Referring to FIG. 3, the positive electrode active material layer 30 includes a third portion 31 and a fourth portion 33 connected to the third portion 31 in the first direction X. The fourth portion 33 includes a second surface 330 and a second end 331, and the third portion 31 includes a fourth surface 310. The fourth surface 310 is connected to the second surface 330 by using a second connection part 301. The second end 331 is a terminal part of the fourth portion 33 away from the second connection part 301, and the second end 331 is a terminal part of the positive electrode active material layer 30.

A thickness of the fourth portion 33 in the second direction Y progressively decreases from the second connection part 301 to the second end 331 in the first direction X. That is, the second connection part 301 is a portion where the thickness of the fourth portion 33 in the second direction Y starts to decrease in the first direction X. In some embodiments, a thickness of the fourth portion 33 in the second direction Y decreases monotonically from the second connection part 301 to the second end 331 in the first direction X, where the thickness may decrease linearly or decrease curvilinearly.

Viewed from the second direction Y, the second end 331 is located in the flat portion 100AA.

The positive electrode active material layer 30 is disposed in the first zone 30a1, and the second zone 30a2 is provided on one side of the second end 331 away from the second connection part 301 in the first direction X.

In this embodiment, the first face 10aa of the negative electrode current collector 10a is disposed toward the second face 30ab of the positive electrode current collector 30a, and the second face 10ab of the negative electrode current collector 10a is disposed toward the first face 30aa of the positive electrode current collector 30a.

The separator 50 is located between the negative electrode active material layer 10 and the positive electrode active material layer 30. The separator 50 includes an electrical insulating material. For example, it may include but is not limited to at least one or more of polyethylene, polypropylene, polyethylene glycol terephthalate, polyimide, and aramid. For example, polyethylene includes at least one component selected from high-density polyethylene, low-density polyethylene, and ultra-high-molecular-weight polyethylene. Particularly, polyethylene and polypropylene have a good effect on decreasing the risk of short-circuit, and may improve stability of the lithium-ion battery through the shutdown effect.

A surface of the separator may further include a porous layer. The porous layer is arranged on at least one surface of the separator and includes inorganic particles and a binder. The inorganic particles are selected from a combination of one or more of aluminum oxide ($Al_2O_3$), silicon oxide ($SiO_2$), magnesium oxide (MgO), titanium oxide ($TiO_2$), hafnium oxide ($HfO_2$), stannic oxide ($SnO_2$), cerium dioxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, and barium sulfate. The binder may be selected from but is not limited to a combination of one or more of polyvinylidene fluoride, a vinylidene fluoride-hexafluoropropylene copolymer, polyamide, polyacrylonitrile, polyacrylate, polyacrylic acid, polyacrylate, sodium carboxymethyl cellulose, polyvinylpyrrolidone, polyvinyl ether, polymethyl methacrylate, polytetrafluoroethylene, and polyhexafluoropropylene.

The porous layer may improve heat resistance, oxidation resistance, and electrolyte infiltration performance of the separator, and enhance adhesion between the separator and a positive electrode or negative electrode.

In this embodiment, the separator 50 is a film layer including a plurality of holes. As shown in FIG. 2, each break in the separator 50 is a hole.

In this embodiment, the separator 50 in the drawings is in contact with neither the negative electrode active material layer 10 nor the positive electrode active material layer 30, but in some embodiments, the separator 50 may be in contact with at least a part of the negative electrode active material layer 10 and the positive electrode active material layer 30.

An example is used below for description. In the example, the first end 131 serves as a terminal part of the negative electrode active material layer 10 close to an end section of the wound electrode assembly 100A, and the second end 331 serves as a terminal part of the positive electrode active material layer 30 close to an end section, that is, part III, of the wound electrode assembly 100A.

The negative electrode active material layer 10 and the positive electrode active material layer 30 are arranged opposite to each other. Specifically, referring to FIG. 3, the first surface 130 and the second surface 330 are at least partially arranged opposite to each other. That is, viewed from the second direction Y, the first surface 130 and the second surface 330 at least partially overlap. The third surface 110 and the fourth surface 310 are at least partially arranged opposite to each other. That is, viewed from the second direction Y, the third surface 110 and the fourth surface 310 at least partially overlap. In the first direction X, the first connection part 101 is located between the second connection part 301 and the second end 331. The thickness of the second portion 13 in the second direction Y perpendicular to the first direction X progressively decreases from the first connection part 101 to the first end 131 in the first direction X, and the thickness of the fourth portion 33 in the second direction Y progressively decreases from the second connection part 301 to the second end 331 in the first direction X, helping to inhibit lithium precipitation while maintaining energy density of the battery 100.

In this embodiment, in the first direction X, the second end 331 may be located between the first connection part 101 and the first end 131. That is, viewed from the second direction Y, the first surface 130 and the second surface 330 at least partially overlap, thereby further helping to inhibit lithium precipitation of the battery.

The negative electrode active material layer 10 and the positive electrode active material layer 30 are separated from each other. A distance from the third surface 110 to the fourth surface 310 in the second direction Y is a first distance D1, a distance from the first surface 130 to the second surface 330 in the second direction Y is a second distance D2, and a distance from the third surface 110 to the second surface 330 in the second direction Y is a third distance D3. D1 and D2 are not equal, and D1 and D3 are not equal either. Specifically, D2 is greater than D1, D3 is greater than D1, and D3 and D2 are not equal. More specifically, D3 may be less than D2.

Figure 4A:
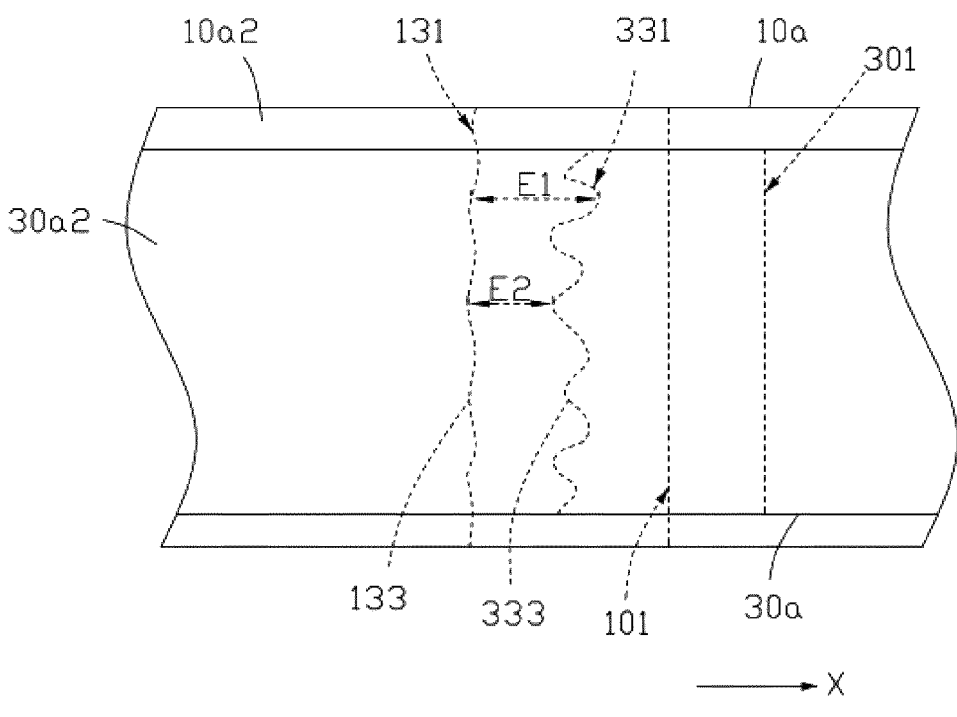
FIG. 4A is a partial top view of part III of the battery in FIG. 2 according to an embodiment of this application.
Figure 5:
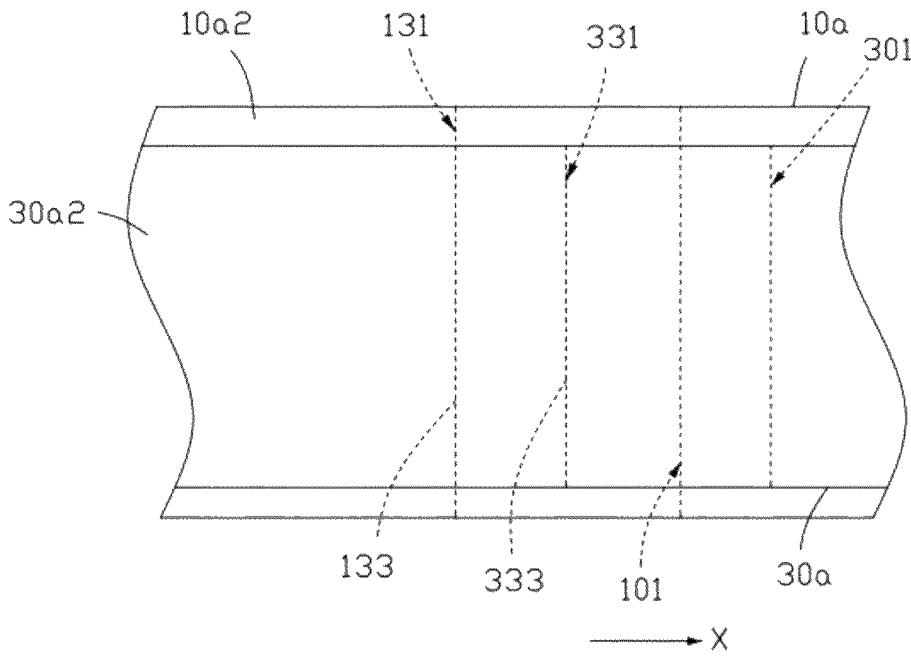
FIG. 5 is a partial top view of part III of the battery in FIG. 2 according to an embodiment of this application.
Figure 6:
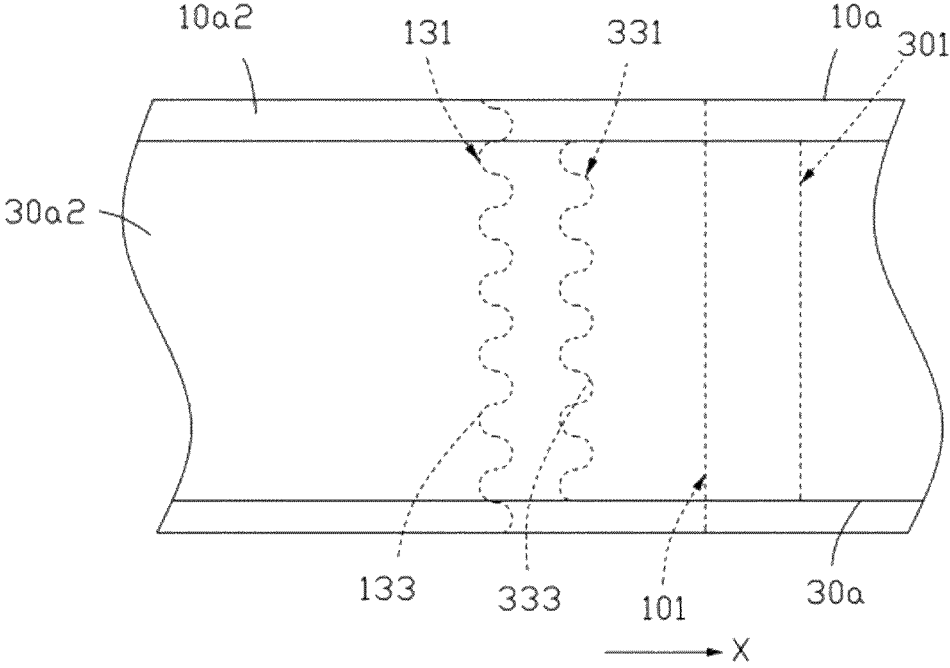
FIG. 6 is a partial top view of part III of the battery in FIG. 2 according to an embodiment of this application.

Referring to FIG. 4A, FIG. 5, and FIG. 6, viewed from the second direction Y, the first end 131 and the second end 331 may be arranged in parallel or not. Viewed from the second direction Y, the first end 131 may be linear or curved in the third direction Z, and the second end 331 may also be linear or curved.

Figure 4B:
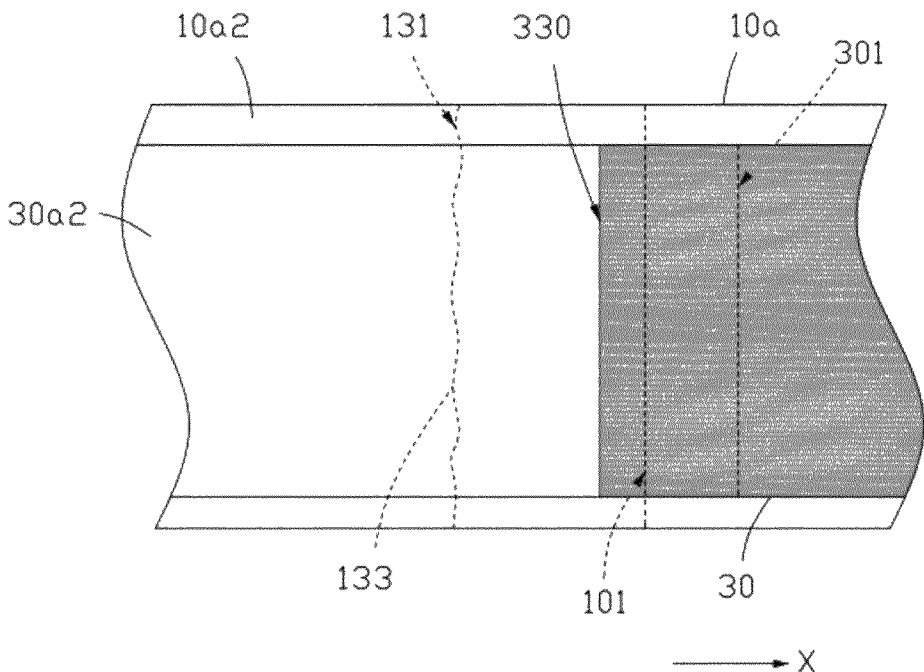
FIG. 4B is a partial cross-sectional view of the battery in a direction IV-IV in FIG. 3 according to an embodiment of this application.

In this embodiment, referring to FIG. 4A, viewed from the second direction Y, the first end 131 has a first zone with a first spacing E1 from the first zone to the second end 331 in the first direction X, and the first end 131 further has a second zone with a second spacing E2 from the second zone to the second end 331 in the first direction X. E1 and E2 are not equal. FIG. 4B is a partial cross-sectional top view of the battery in a plane formed in the directions X and Z. The cross-section shows the positive electrode active material layer 30. In FIG. 4B, a distance from a terminal part of the positive electrode active material layer 30 close to the first end 131 in the first direction X to the first end 131 is greater than a distance from the second end 331 to the first end 131 in the first direction X.

Specifically, referring to FIGS. 4A and 6, viewed from the second direction Y, the second end 331 may have a plurality of protrusions 333. For example, the second end 331 may be in but is not limited to a wave or zigzag shape. Similarly, the first end 131 may also have a plurality of protrusions 133. For example, the first end 131 may be in but is not limited to a wave or zigzag shape.

In some embodiments, referring to FIGS. 7 to 9A, the battery 100 may further include a first layer 60, and the first layer 60 may include an insulating material. The first layer 60 may further include a material that is capable of restricting migration of ions. The first layer 60 is capable of restricting migration of ions, for example, blocking or isolating migration of ions. In some embodiments, the insulating material may be but is not limited to a single-sided adhesive paper or a double-sided adhesive paper. In this case, it may be avoided that an end portion of the first layer 60 falls off from a surface of 30.

The first layer 60 binds the second end 331 and the second surface 330, contiguously covers the second end 331 and the second surface 330, and inhibits lithium precipitation of the battery by suppressing lithium ions generated by the positive electrode active material layer 30 from reaching the opposite negative electrode active material layer 10.

In this embodiment, the first layer 60 may further extend from the second surface 330 to the fourth surface 310 to bind the fourth surface 310 and cover a part of the fourth surface 310, thereby further suppressing the lithium ions generated by the positive electrode active material layer 30 from reaching the negative electrode active material layer 10, thus avoiding lithium precipitation.

In this embodiment, a length of a part of the first layer 60 may bound to the fourth surface 310 in the first direction X may be less than or equal to 5 mm, so as to reduce energy density loss while inhibiting lithium precipitation of the battery.

In this embodiment, the first layer 60 may further extend from the second end 331 to the second zone 30_a_2 to bind the second zone 30_a_2 and cover at least a part of the second zone 30_a_2, so as to help ensure that the first layer 60 is still bound to the second end 331 when an edge of the first layer 60 upwarps, thereby further inhibiting lithium precipitation of the battery. In addition, when the first layer 60 includes an insulating material, the first layer 60 covering the second zone 30_a_2 may further reduce a probability of a short circuit between the positive electrode plate 30A and the negative electrode plate 10A. When the first layer 60 extends from the second end 331 to the second zone 30_a_2 and covers the second zone 30_a_2, a crease 65 is correspondingly formed on a surface of the first layer 60 away from the second end 331. Viewed from the second direction Y, the crease 65 is located between the first end 131 and the second end 331.

Figure 9A:
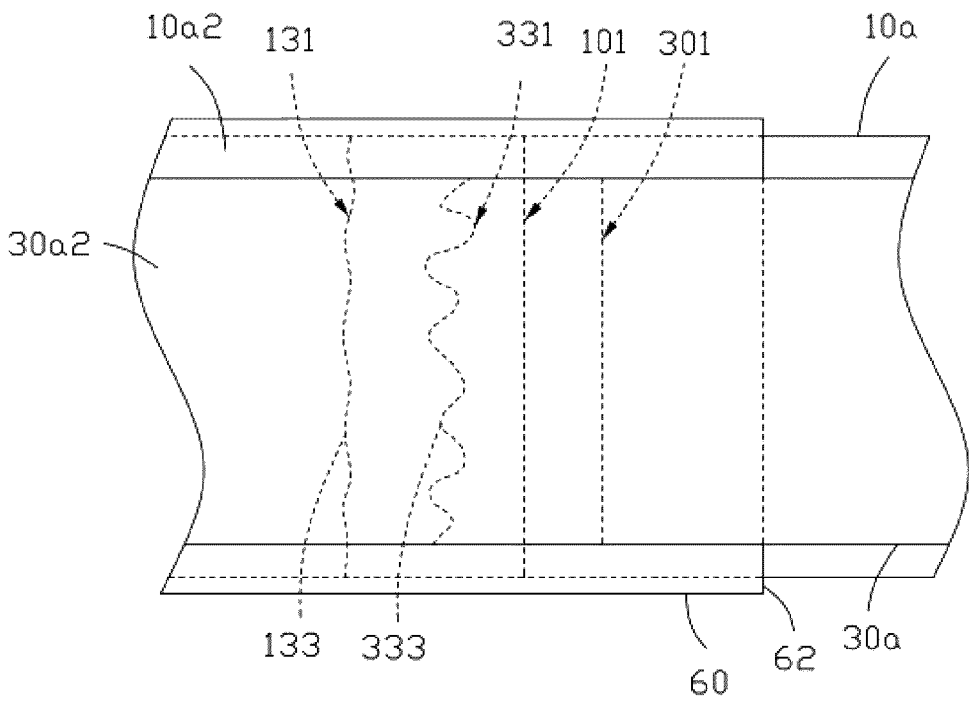
FIG. 9A is a partial top view of part VIII of the battery in FIG. 7 according to an embodiment of this application.
Figure 9B:
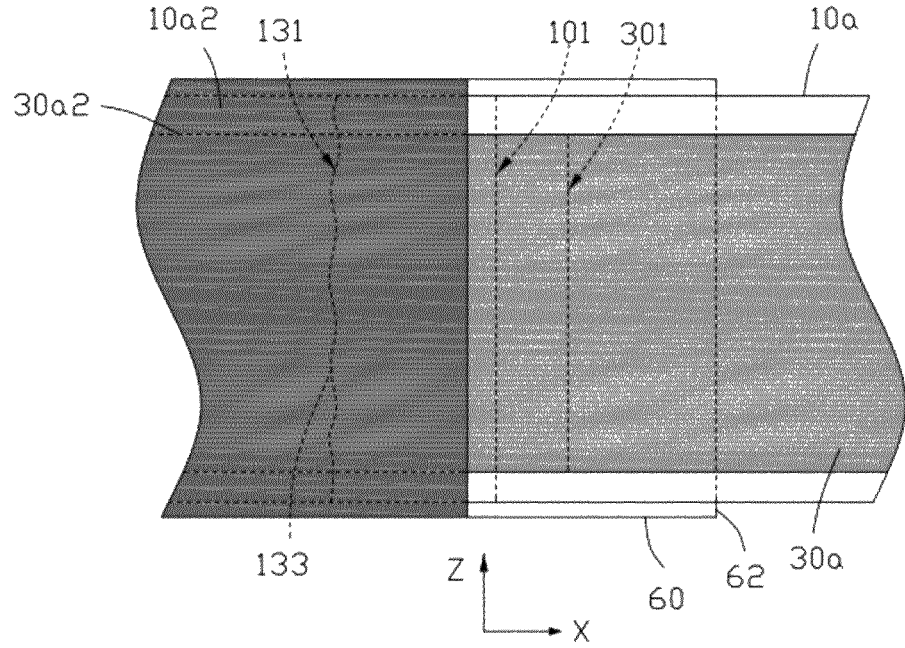
FIG. 9B is a partial cross-sectional view of the battery in a direction IX-IX in FIG. 8 according to an embodiment of this application.

FIG. 9B is a partial cross-sectional top view of the battery in a plane formed in the directions X and Z. The cross-section shows the positive electrode active material layer 30 and the first layer 60 bound to the positive electrode active material layer 30. In FIG. 9B, a distance from a terminal part of the positive electrode active material layer 30 close to the first end 131 in the first direction X to the first end 131 is greater than a distance from the second end 331 to the first end 131 in the first direction X.

The first layer 60 includes a third end 62 and a fourth end 64 that are spaced apart and away from each other in the first direction X. In the first direction X, the third end 62 is located on one side of the second connection part 301 away from the second end 331, and the fourth end 64 is located on one side of the second connection part 301 away from the third end 62.

Figure 7:
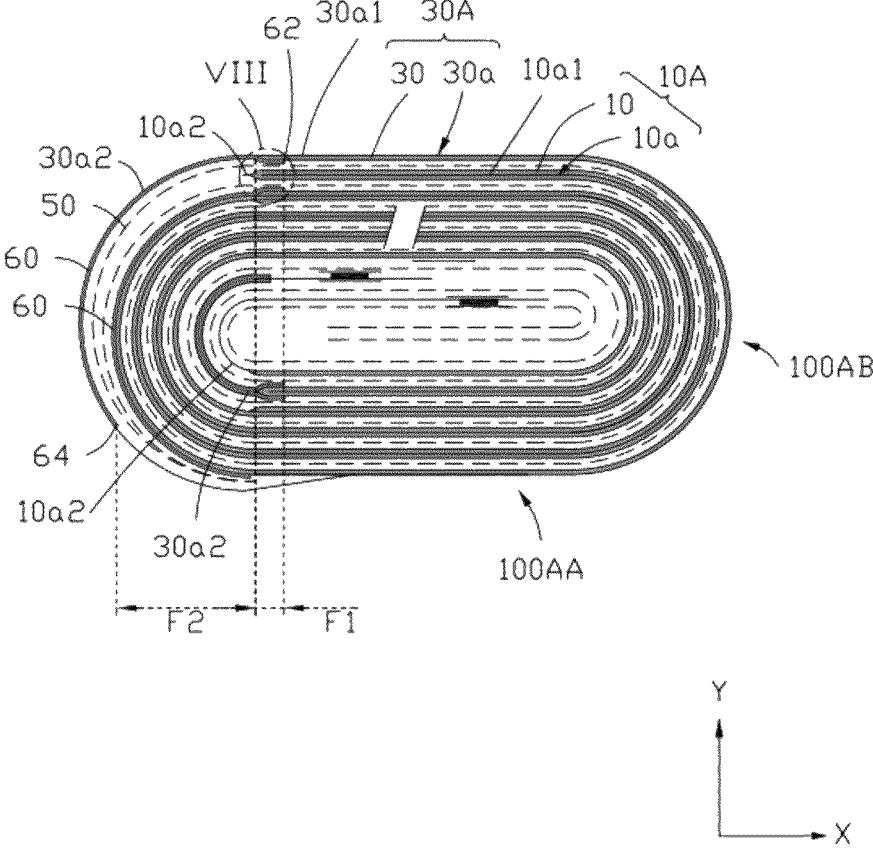
FIG. 7 is a schematic cross-sectional diagram of part III of the battery in FIG. 2 according to an embodiment of this application.
Figure 8:
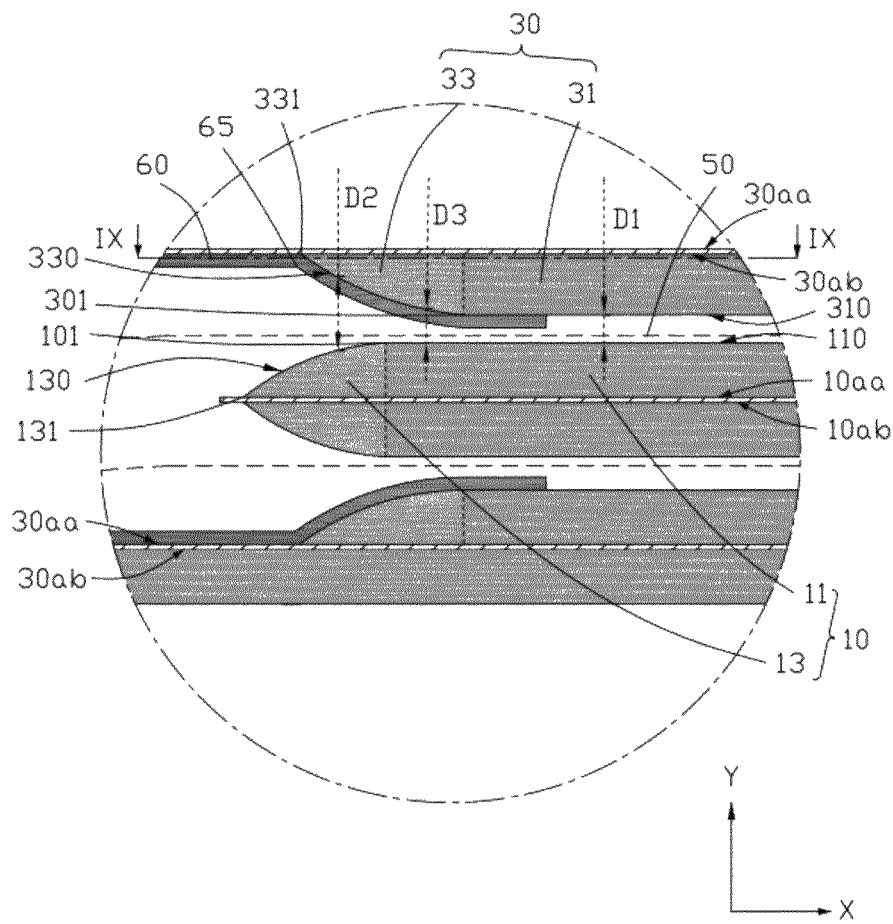
FIG. 8 is a partially enlarged schematic diagram of part VIII of the battery in FIG. 7 according to an embodiment of this application.

As shown in FIG. 7, viewed from the second direction Y, a distance from the second end 331 to the third end 62 in the first direction X is a fourth distance F1, and a distance from the second end 331 to the fourth end 64 in the first direction X is a fifth distance F2. F1 and F2 are not equal. Preferably, F1 is less than F2.

As shown in FIGS. 9A and 9B, viewed from the second direction Y, a width of the first layer 60 in the direction Z is greater than a width of the positive electrode active material layer 30 in the direction Z, thereby helping to inhibit lithium precipitation of the battery. In some embodiment, the width of the first layer 60 in the direction Z is greater than a width of the positive electrode plate 30A in the direction Z, and greater than a width of the negative electrode plate 10A in the direction Z, thereby helping to further inhibit lithium precipitation of the battery, and helping to further reduce the probability of a short circuit between the positive electrode plate 30A and the negative electrode plate 10A. In some embodiments, on the basis that the width of the first layer 60 in the direction Z is greater than the width of the positive electrode active material layer 30 in the direction Z, the width of the first layer 60 in the direction Z may be greater than, less than, or equal to a width of the negative electrode active material layer 10 in the direction Z.

Figure 10:
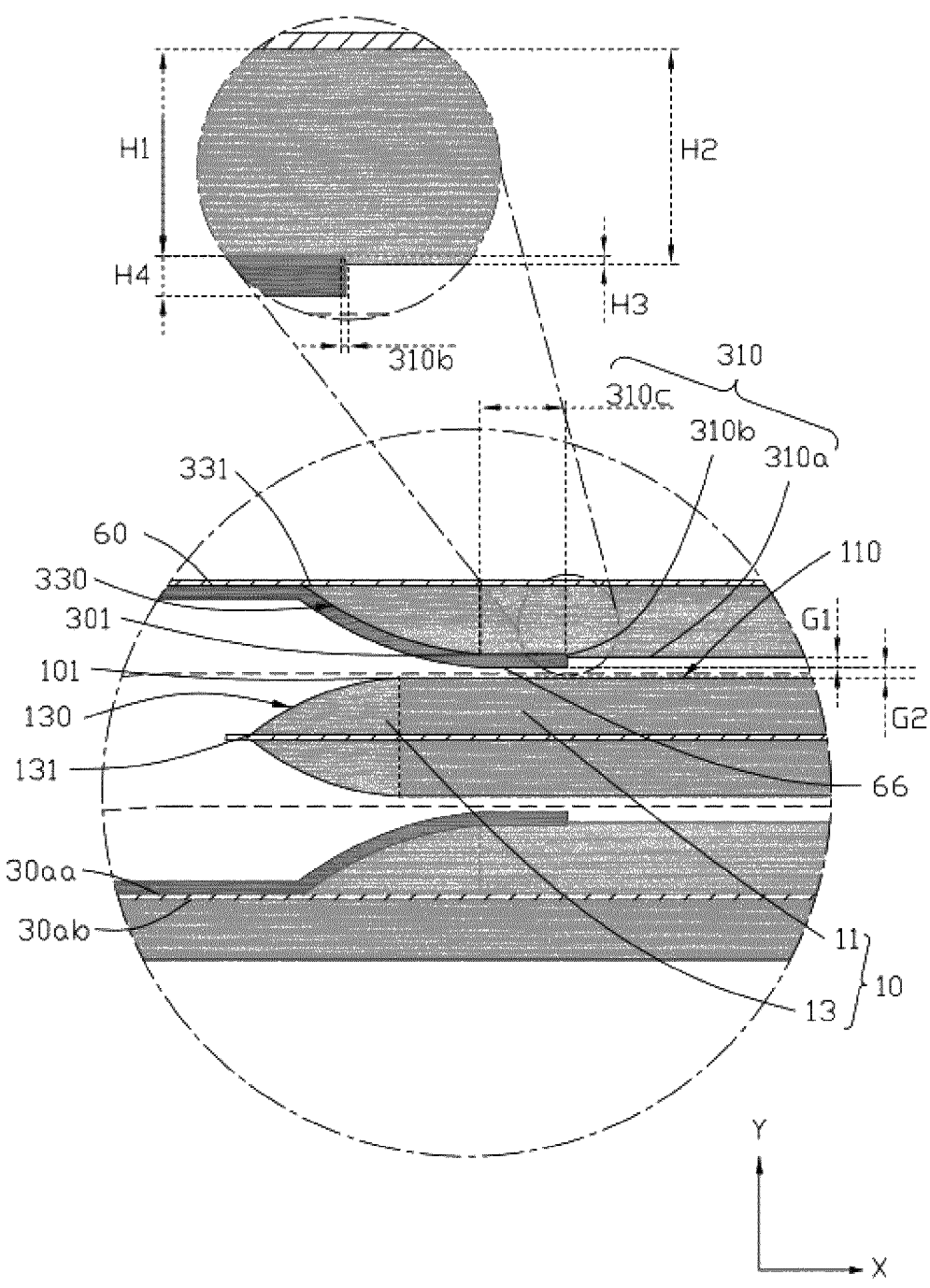
FIG. 10 is a partially enlarged schematic diagram of part VIII of the battery in FIG. 7 according to an embodiment of this application.

In some embodiments, referring to FIG. 10, the fourth surface 310 may include a third zone 310_a_, a step zone 310_b_, and a fourth zone 310_c_ that are sequentially connected in the first direction X. A thickness H1 of a part of the positive electrode active material layer 30 corresponding to the fourth zone 310_c_ in the second direction Y is less than a thickness H2 of a part of the positive electrode active material layer 30 corresponding to the third zone 310_a_. Viewed from the second direction Y, the fourth zone 310_c_ is located between the step zone 310_b_ and the first connection part 101. The first layer 60 covers the fourth zone 310_c_, helping to reduce impact of disposing the first layer 60 on the thickness of the battery, thus helping to improve volumetric energy density of the battery.

In this embodiment, in the second direction Y, the thickness H1 of the part of the positive electrode active material layer 30 corresponding to the fourth zone 310_c_ in the second direction Y is greater than a height H3 of the step zone 310_b_.

In some embodiments, as shown in FIG. 10, the step zone 310_b_ is a step surface connecting the third zone 310_a_ and the fourth zone 310_c_, and may be an inclined curved surface.

In this embodiment, a thickness H4 of the first layer 60 in the second direction Y may be greater than the height H3 of the step zone 310_b_ in the second direction Y. Herein, the height of the step zone 310_b_ refers to a distance in the second direction Y from a junction between the step zone 310_b_ and the third zone 310_a_ to a junction between the step zone 310_b_ and the fourth zone 310_c_.

In some embodiments, the first layer 60 may also cover the step zone 310_b_, or cover the step zone 310_b_ and a part of the third zone 310_a_.

A part of the first layer 60 located in the fourth zone 310_c_ includes a fifth surface 66. The fifth surface 66 is opposite from the fourth zone 310_c_. In some embodiments, the fifth surface 66 includes a part having a distance G1 to the third zone 310_a_ in the second direction Y greater than a distance G2 to the third surface 110 in the second direction Y.

In some embodiments, the fourth surface 310 may alternatively be a flat surface.

Figure 11:
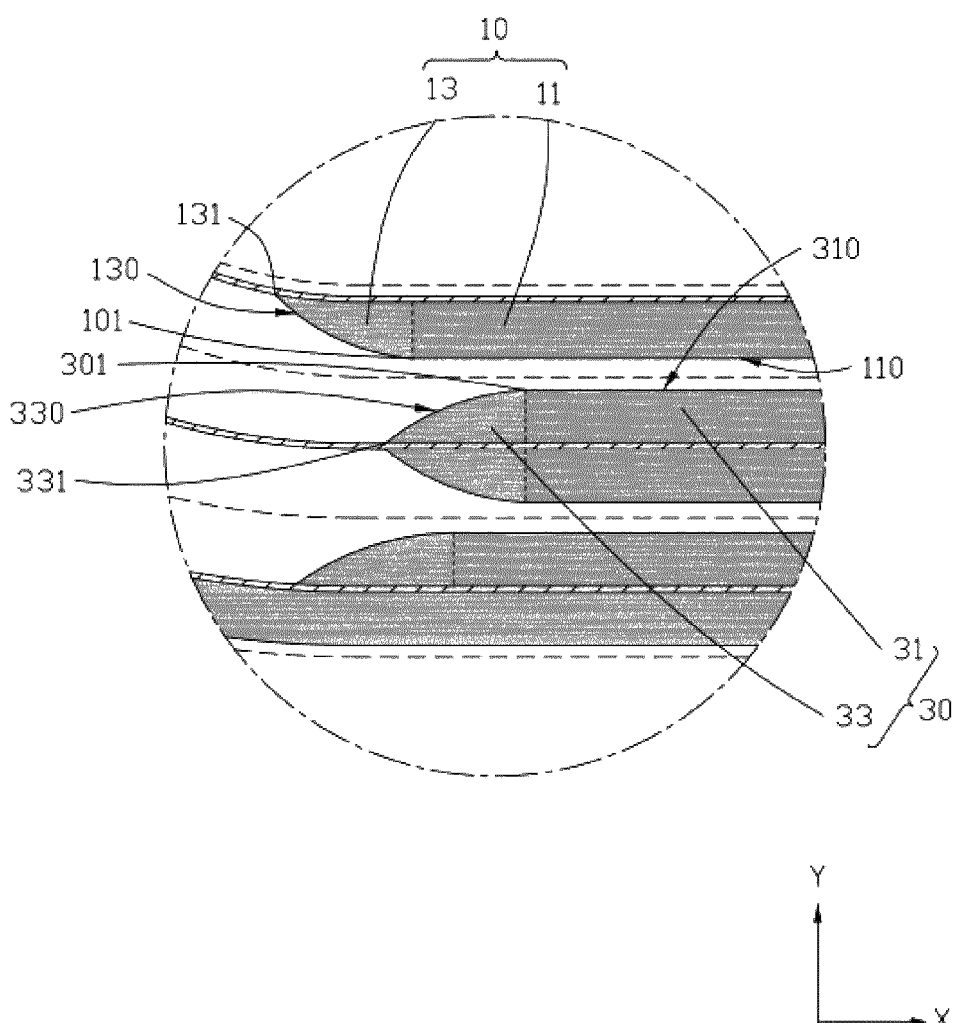
FIG. 11 is a partially enlarged schematic diagram of part XI of the battery in FIG. 2 according to an embodiment of this application.
Figure 12:
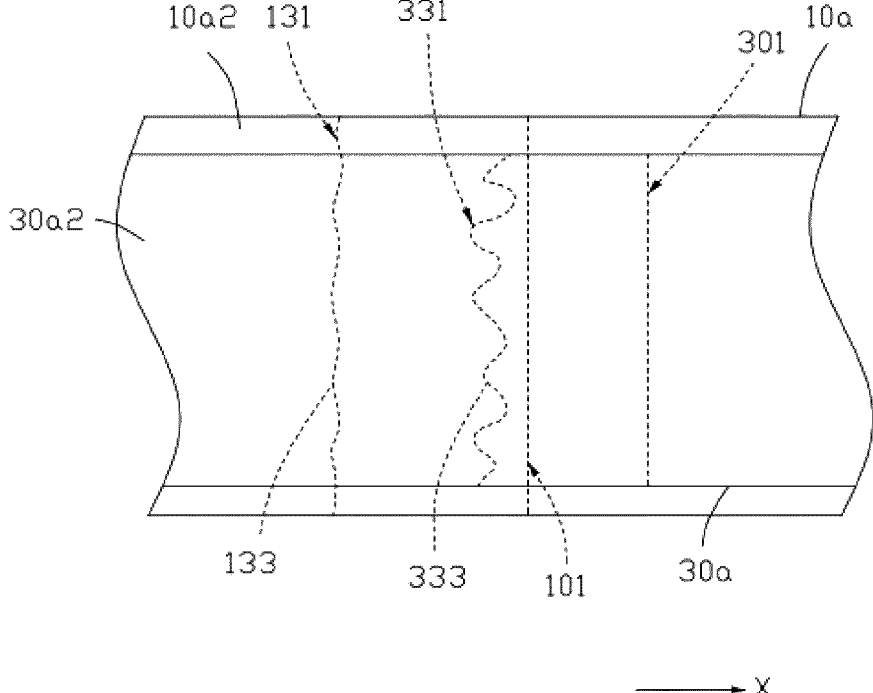
FIG. 12 is a partial top view of part XI of the battery in FIG. 2 according to an embodiment of this application.

In some embodiments, referring to FIGS. 11 and 12, the first end 131 may alternatively be a terminal part of the negative electrode active material layer 10 close to an initial section of the wound electrode assembly 100A, and the second end 331 may alternatively be a terminal part of the positive electrode active material layer 30 close to an initial section of the wound electrode assembly 100A.

According to the battery in this application, the thickness of the second portion in the second direction gradually decreases from the first connection part to the first end in the first direction, and the thickness of the fourth portion in the second direction gradually decreases from the second connection part to the second end in the first direction, thereby helping to improve the energy density of the battery. In the first direction, the first connection part is located between the second connection part and the second end, thereby helping to inhibit lithium precipitation of the battery. Therefore, the structure of the battery in this application helps to inhibit lithium precipitation while maintaining energy density of the battery.

In addition, a person of ordinary skill in the art can make various other corresponding changes and modifications according to the technical concept of this application, and all such changes and modifications should fall within the protection scope of this application.

What is claimed is:

1. A battery, comprising an electrode assembly comprising:

a negative electrode plate comprising a negative electrode current collector and a negative electrode active material layer;

a positive electrode plate comprising a positive electrode current collector and a positive electrode active material layer; and a separator disposed between the positive electrode active material layer and the negative electrode active material layer;

wherein in a first direction, the negative electrode active material layer comprises a first portion and a second portion connected to the first portion, the second portion comprises a first surface and a first end, the first surface is connected to the first portion by using a first connection part, the first end is away from the first connection part and is a terminal part of the negative electrode active material layer, and a thickness of the second portion in a second direction perpendicular to the first direction decreases from the first connection part to the first end in the first direction;

in the first direction, the positive electrode active material layer comprises a third portion and a fourth portion connected to the third portion, the fourth portion comprises a second surface and a second end, the second surface is connected to the third portion by using a second connection part, the second end is away from the second connection part and is a terminal part of the positive electrode active material layer, and a thickness of the fourth portion in the second direction gradually decreases from the second connection part to the second end in the first direction;

along a thickness direction of the electrode assembly, the first surface and the second surface are the surfaces of two adjacent layers of positive electrode plate and negative electrode plate; and the first surface and the second surface are at least partially arranged opposite to each other; and in the first direction, the first connection part is located between the second connection part and the second end.

2. The battery according to claim 1, wherein in the first direction, the second end is located between the first connection part and the first end.

3. The battery according to claim 1, wherein the first portion comprises a third surface, and the third portion comprises a fourth surface; wherein the third surface and the first surface are connected by using the first connection part, the fourth surface and the second surface are connected by using the second connection part, and the third surface and the fourth surface are at least partially arranged opposite to each other.

4. The battery according to claim 3, wherein the third surface and the fourth surface at least partially overlap in the second direction, the first surface and the second surface at least partially overlap in the second direction, and the third surface and the second surface at least partially overlap in the second direction.

5. The battery according to claim 4, wherein a distance from the third surface to the fourth surface in the second direction is a first distance, and a distance from the first surface to the second surface in the second direction is a second distance, wherein the first distance is different from the second distance.

6. The battery according to claim 5, wherein the first distance is less than the second distance.

7. The battery according to claim 5, wherein a distance from the third surface to the second surface in the second direction is a third distance, wherein the third distance is different from the first distance.

8. The battery according to claim 7, wherein the third distance is greater than the first distance.

9. The battery according to claim 7, wherein the third distance is different from the second distance.

10. The battery according to claim 7, wherein the third distance is less than the second distance.

11. The battery according to claim 3, further comprising a first layer, and the first layer binds the second end and the second surface and contiguously covers the second end and the second surface.

12. The battery according to claim 11, wherein the first layer is configured to block migration of ions and comprises at least one of a single-sided adhesive paper and a double-sided adhesive paper.

13. The battery according to claim 11, wherein the first layer further binds the fourth surface and covers at least a part of the fourth surface.

14. The battery according to claim 11, wherein the battery further comprises a positive electrode current collector, the positive electrode current collector is located on one side of the positive electrode active material layer facing away from the first surface and the third surface, the positive electrode current collector comprises a first zone with the positive electrode active material layer being provided on the first zone and a second zone located on one side of the second end away from the second connection part in the first direction, the second zone is provided with no positive electrode active material layer, and the first layer binds the second zone and covers at least a part of the second zone.

15. The battery according to claim 14, wherein in the first direction, the first layer comprises a third end and a fourth end arranged away from each other, and in the first direction, the third end is located on one side of the second connection part away from the second end, and the fourth end is located on one side of the second connection part away from the third end; and viewed from the second direction, a distance from the second end to the third end is a fourth distance, a distance from the second end to the fourth end is a fifth distance, and the fourth distance is different from the fifth distance.

16. The battery according to claim 15, wherein the fourth distance is less than the fifth distance.

17. The battery according to claim 11, wherein the fourth surface comprises a third zone, a step zone, and a fourth zone sequentially connected in the first direction; and a thickness of a part of the positive electrode active material layer corresponding to the fourth zone in the second direction is less than a thickness of a part of the positive electrode active material layer corresponding to the third zone; and viewed from the second direction, the fourth zone is located between the step zone and the first connection part, and the first layer covers the fourth zone.

18. The battery according to claim 17, wherein a thickness of the first layer in the second direction is greater than a height of the step zone in the second direction.

19. The battery according to claim 18, wherein a part of the first layer located in the fourth zone comprises a fifth surface, the fifth surface is opposite from the fourth zone, and the fifth surface comprises a part having a distance to the third zone in the second direction greater than a distance to the third surface in the second direction.

20. The battery according to claim 1, wherein viewed from the second direction, the first end has a first zone with a first spacing from the first zone to the second end in the first direction and a second zone with a second spacing from the second zone to the second end in the first direction, wherein the first spacing is different from the second spacing.

21. The battery according to claim 1, wherein viewed from the second direction, the second end has a plurality of protrusions.

22. An electronic device, comprising: a battery, wherein the battery comprises: an electrode assembly comprising:

a negative electrode plate comprising a negative electrode current collector and a negative electrode active material layer;

a positive electrode plate comprising a positive electrode current collector and a positive electrode active material layer; and a separator disposed between the positive electrode active material layer and the negative electrode active material layer;

wherein in a first direction, the negative electrode active material layer comprises a first portion and a second portion connected to the first portion, the second portion comprises a first surface and a first end, the first surface is connected to the first portion by using a first connection part, the first end is away from the first connection part and is a terminal part of the negative electrode active material layer, and a thickness of the second portion in a second direction perpendicular to the first direction decreases from the first connection part to the first end in the first direction;

in the first direction, the positive electrode active material layer comprises a third portion and a fourth portion connected to the third portion, the fourth portion comprises a second surface and a second end, the second surface is connected to the third portion by using a second connection part, the second end is away from the second connection part and is a terminal part of the positive electrode active material layer, and a thickness of the fourth portion in the second direction gradually decreases from the second connection part to the second end in the first direction;

along a thickness direction of the electrode assembly, the first surface and the second surface are the surfaces of two adjacent layers of positive electrode plate and negative electrode plate; and the first surface and the second surface are at least partially arranged opposite to each other, and in the first direction, the first connection part is located between the second connection part and the second end.

* * * * *